(12) United States Patent
Gebhardt

(10) Patent No.: US 8,567,732 B2
(45) Date of Patent: Oct. 29, 2013

(54) BRACKET CONSTRUCTION FOR MOUNTING A LINK CHAIN

(75) Inventor: Lawrence S. Gebhardt, Sterling, IL (US)

(73) Assignee: Allied-Locke Industries, Inc., Dixon, IL (US)

( * ) Notice: Subject to any disclaimer, the term of this patent is extended or adjusted under 35 U.S.C. 154(b) by 90 days.

(21) Appl. No.: 13/282,104

(22) Filed: Oct. 26, 2011

(65) Prior Publication Data

US 2013/0037664 A1   Feb. 14, 2013

Related U.S. Application Data

(60) Provisional application No. 61/521,195, filed on Aug. 8, 2011.

(51) Int. Cl.
*F16M 11/00* (2006.01)
(52) U.S. Cl.
USPC ........... 248/201; 248/501; 248/506; 474/156; 474/219

(58) Field of Classification Search
CPC ..................................................... F16G 13/06
USPC ......... 248/201, 200, 680, 207, 500, 501, 506, 248/228.1; 474/156, 219
See application file for complete search history.

(56) References Cited

U.S. PATENT DOCUMENTS

| | | | | |
|---|---|---|---|---|
| 1,504,478 | A | * | 8/1924 | Hyser ........................... 361/651 |
| 2,153,679 | A | * | 4/1939 | Rich ............................... 248/506 |
| 4,033,531 | A | * | 7/1977 | Levine .......................... 248/558 |
| 4,826,117 | A | * | 5/1989 | Bastian et al. ............. 248/188.2 |
| 5,732,918 | A | * | 3/1998 | Steele et al. .................. 248/237 |
| 2003/0010886 | A1 | * | 1/2003 | Barnes et al. ................. 248/680 |

* cited by examiner

*Primary Examiner* — Anita M King
(74) *Attorney, Agent, or Firm* — Banner & Witcoff, Ltd.

(57) ABSTRACT

A bracket assembly for mounting a link chain includes first and second opposed mirror image brackets each bracket having a uniformly thick base flange for mounting on a surface for support and an upstanding transverse link attachment flange which includes spaced openings symmetrically positioned for replication of a chain link plate and for attachment of the plates of a chain link to a pair of opposed spaced brackets.

10 Claims, 3 Drawing Sheets

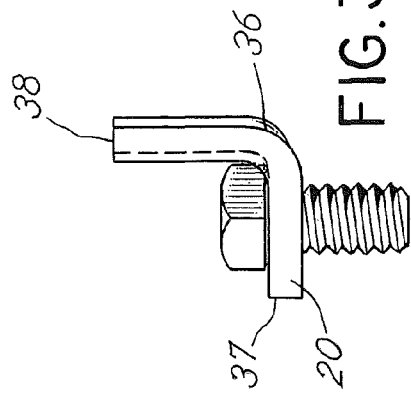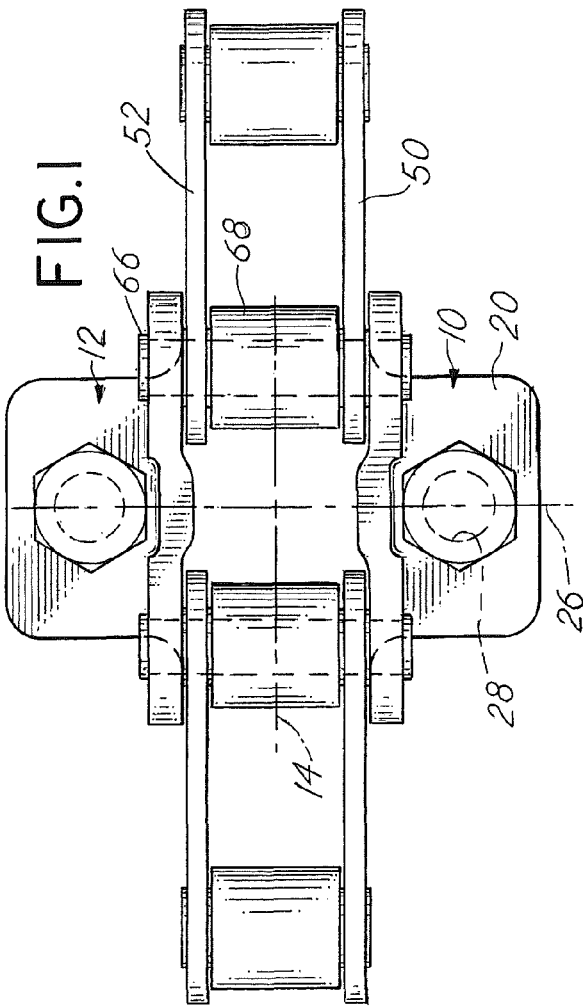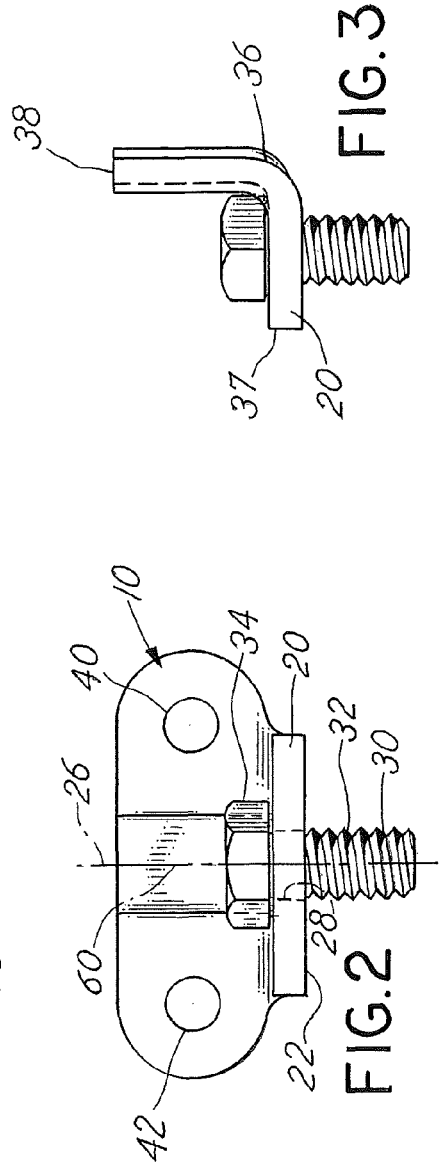

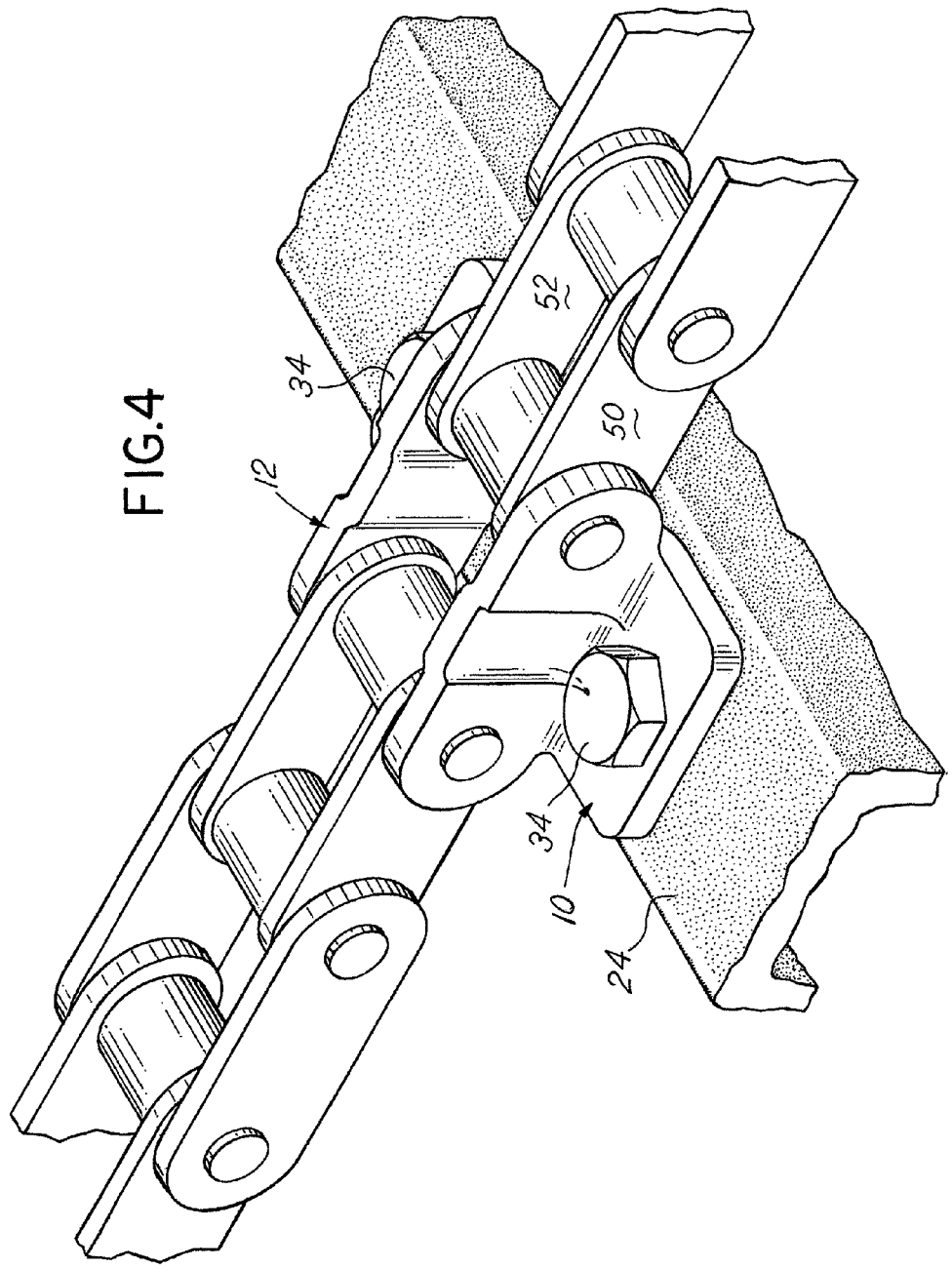

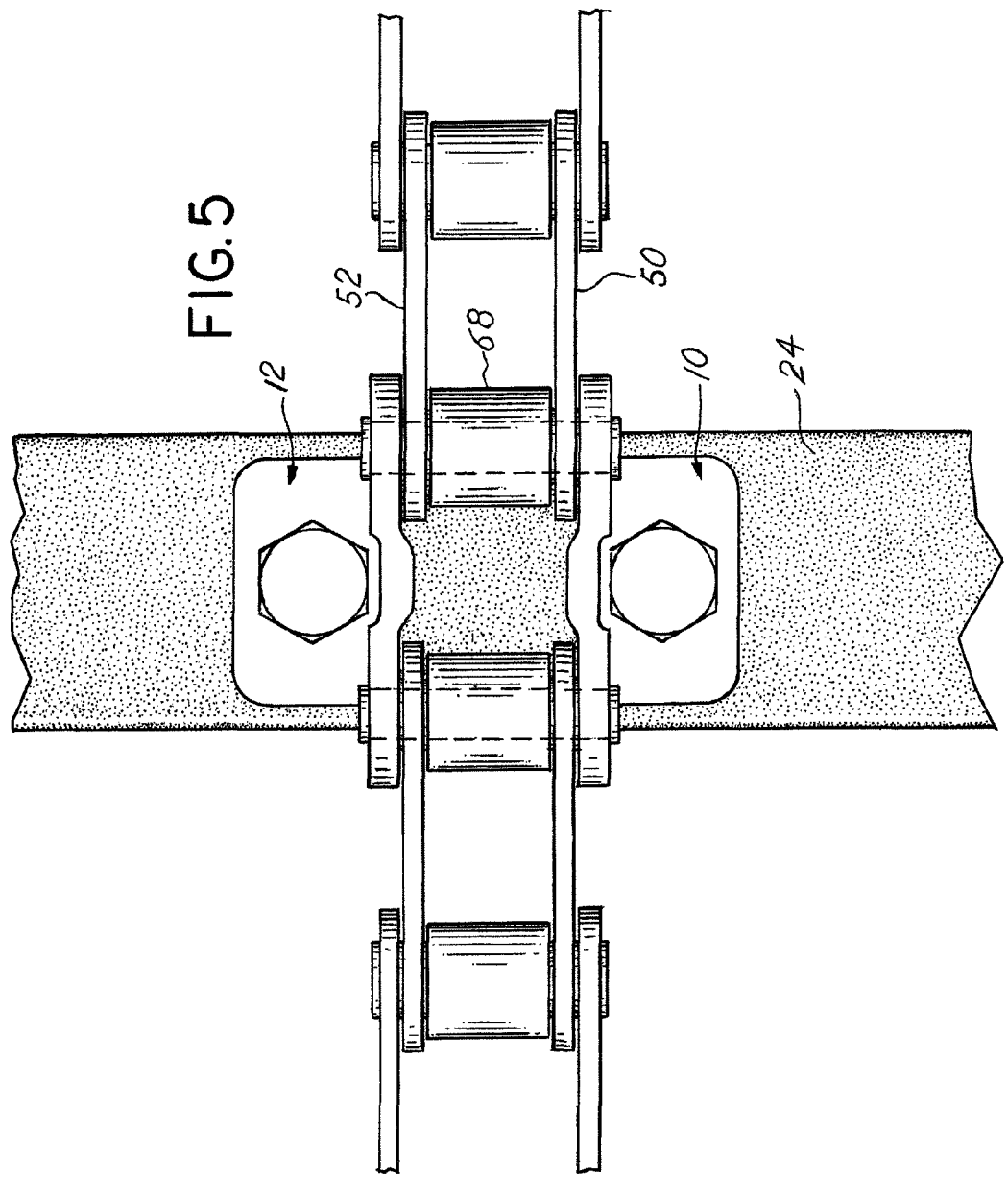

BRACKET CONSTRUCTION FOR MOUNTING A LINK CHAIN

CROSS REFERENCE TO RELATED APPLICATION

This is a utility application incorporating by reference and claiming priority to previously filed and co-pending provisional patent application Ser. No. 61/521,195 filed Aug. 8, 2011 entitled Bracket Construction for Mounting a Link Chain.

BACKGROUND OF THE INVENTION

In a principal aspect the invention relates to a bracket assembly in combination with a link chain wherein the link chain is comprised of an elongate series of connected, spaced plates that may be driven by a sprocket drive.

Various types of machinery incorporate link chains which may be driven by a drive sprocket. The link chain is comprised of spaced plates that are interconnected by pins. The gear teeth of a drive sprocket engage between the spaced plates and upon rotation of the drive sprocket cause movement of the chain. In this manner, the chain which is connected to some moving part of a machine is caused to reciprocate, rotate or otherwise move.

For example, such link chains are fastened in some fashion to a reciprocating machine member or element such as a cutter blade. A sprocket drive engaged with the link chain may thus effect reciprocal movement of the blade.

Various assemblies have been proposed for attachment of the link chain to an element of a machine to thereby utilize the movement, such as reciprocal movement, of the link chain to drive that element. Design of bracket assemblies for this purpose thus becomes a significant challenge inasmuch as such assemblies must be cooperative with link chains and at the same time be easily fastened onto a machine element. Also such assemblies must also be sized in a manner that will enable them to work efficiently with various types and sizes of machine elements.

SUMMARY OF THE INVENTION

In a principal aspect the invention comprises a bracket assembly which includes first and second opposed, substantially identical brackets which can be integrated and combined with a link chain. The brackets include a base flange which may be attached to a machine element and a transverse, integral, unitary link attachment flange which is adapted to replicate and replace a plate of a link chain. Among the features and aspects of each bracket of the assembly is an offset portion at the mid-section of the link attachment flange between link attachment pin openings located symmetrically on opposite sides of the offset portion. This arrangement facilitates the utilization of a fastener to attach the base flange to a surface, for example, a reciprocal element of a machine and at the same time provide for ease of attachment of link chain plates to a mirror image array of the first and second brackets.

Thus, it is an aspect of the invention to provide an improved bracket assembly for combination with a standard link chain.

Another aspect and object of the invention is to provide a rugged yet easily assembled bracket assembly comprised of first and second brackets that can be arranged in opposed fashion for connection to the spaced plates of a link chain.

Another object of the invention is to provide a bracket assembly comprised of first and second opposed, first and second mirror image brackets which are each symmetrical about a medial plane of symmetry of the brackets.

These and other objects, advantages, features and aspects of the invention are set forth in a detailed description as follows.

BRIEF DESCRIPTION OF THE DRAWING

In the detailed description which follows, reference will be made to the drawing comprised of the following figures:

FIG. 1 is a top plan view of the bracket assembly of the invention in combination with a link chain;

FIG. 2 is a side elevation of a single bracket of the bracket assembly;

FIG. 3 is a side elevation of the bracket of FIG. 2;

FIG. 4 is an isometric view illustrating the bracket assembly in combination with a link chain; and FIG. 5 is a top view of the bracket assembly in combination with a link chain.

DESCRIPTION OF AN EMBODIMENT OF THE INVENTION

Referring to the figures, the bracket assembly comprises a first bracket 10 and a second bracket 12. The brackets 10 and 12 are substantially identical and are arrayed in opposite or opposed, mirror image positions when in use as illustrated in FIGS. 1, 4 and 5. Thus, the brackets 10 and 12 are spaced from each other on opposite sides of a medial plane or axis 14 by a distance which enables the brackets 10 and 12 to be appropriately connected with spaced end links of a multilink, link chain.

The description of a single bracket 10 of the bracket assembly comprising the pair of brackets 10 and 12 is applicable to each of those brackets 10, 12. Reference is therefore made to the drawings with respect to a description of a first bracket 10.

The first bracket 10 includes a generally planar uniformly thick, generally rectangular base flange 20 with a lower surface 22 designed to fit or rest upon a support member or support surface 24. The first bracket member 10 and, more particularly, the base flange 20 includes a medial axis and plane of symmetry 26 with a fastener opening 28 therethrough for receipt of a fastener such as a bolt 30. The bolt 30 includes a threaded shaft 32 and a head 34, which is typically polygonal for engagement by a tool such as a wrench.

The base flange 20 includes an inside edge 37 and outer or outside, generally straight edge 36 with a link attachment flange 38 projecting transversely or at a right angle from plane or flat surface 22 of the base flange 20 along the outside edge 36. The medial axis or plane 26 of the base flange 20 also comprises a medial plane for the link attachment flange 38 and thus, the link attachment flange 38 is substantially identical on opposite sides of the plane 26. That is, the flange 38 includes a first link pin passage or opening 40 and a second link pin passage 42 spaced-equal distances from plane 26 on opposite sides of the plane 26. Additionally, the openings 40 and 42 are centered an equal distance dimension from the surface 22 of the base flange 20. The openings 40 and 42 are spaced from one another on opposite sides of the medial plane 26 by a distance which is substantially equal to the distance of the spaced link pin openings of a chain link plate, such as chain link plate 50 in FIG. 1. Thus, the bracket assembly brackets 10 and 12 and more particularly the link attachment flange 38 thereof effectively comprise a substitute for a pair of chain link plates such as plates 50 and 52 as depicted in FIG. 1.

The openings 40 and 42 are positioned sufficiently above the surface or base flange 20 so that flange 38 generally replicates the configuration and shape of plates 50 and 52 and provides adequate clearance for the movement of the plates 50, 52 once they are affixed to the brackets 10 and 12. The brackets 10, 12 are uniformly spaced substantially equal to the spacing of plates 50, 52 when fastened to the element or support surface 24.

An important feature of the construction of the brackets 10 and 12 is the configuration in the center region 60 of the generally uniformly thick, generally rectangular link attachment flange 38. Specifically, that region or portion or section 60 is laterally offset away from the fastener opening 28 that receives the shaft 32 of the fastener 30 in base flange 20. The side to side dimension of the offset section 60 between the openings 40, 42 is approximately equal to or slightly greater than the maximum diameter of the head 34 on the shaft 32. As a consequence, the head 34 on the shaft 32 is provided with adequate clearance to rotate when attaching the brackets 10 and 12 to a support surface 24 by means of fastener 30. This enables the assembly depicted in FIGS. 1, 4 and 5 to be more compact and efficient and to enable easy integration of a chain formed of links or plates, such as links 50 and 52. Thus, such as links or plates 50 and 52, can receive a pin 66 which fits through openings, such as openings 40 and an annular spacer or washer 68 may be supported on the pin 66 between the plates 50, 52 to hold the plates 50 and 52 in spaced relation to one another and during attachment to the bracket assembly comprised of the brackets 10 and 12.

The brackets 10 and 12 are arranged in mirror like fashion or in opposed relation on opposite sides of the plane 14 and are generally symmetrical with respect to the medial plane 26. Because of this construction, the assembly of the component parts of the bracket assembly in combination with a link chain is made much easier. The standardization of the parts in combination with the particular construction of the parts facilitates the attachment of a link chain as described to a component which is to be driven by means of the link chain engaging a sprocket (not shown). The figures set forth typical dimensions of the component parts and the relative dimensions thereof which represent a ratio of the offset or offset portion 60 to the other dimensions of a bracket element or first and second brackets 10 or 12.

Variations of the construction may be provided, however, the symmetry of the component parts comprises an important feature as does the offset section or element 60. Thus, while there has been set forth an embodiment of the invention, it is to be understood that the invention is limited only the following claims and their equivalents thereof.

What is claimed is:

1. A bracket assembly for mounting a link chain having a series of pivot pins connected, spaced, generally parallel, substantially identical chain link plates, said chain capable of engagement by teeth of a drive sprocket in the space between plates and intermediate the pin connections of said chain link plates, said bracket assembly comprising:
   substantially identical first and second unitary bracket elements, each bracket element including a generally planar, substantially uniformly thick base flange with a mounting surface mounting said base flange upon a support surface and a base attachment opening in said base flange for receipt of a fastener for affixing said base flange to said support surface, said base flange including an outer edge and an inner edge,
   each said bracket element further including a generally planar uniformly thick link attachment flange projecting generally transversely from the base flange along the outer edge, said link attachment flange comprising a chain link plate having first and second spaced pin attachment openings generally parallel to and spaced from the outer edge of the base flange, said pin attachment openings separated laterally from said base attachment opening of said base flange, said base attachment opening positioned medially between said first and second pin attachment openings, at least a portion of said link attachment flange intermediate said first and second pin attachment openings being offset laterally away from said outer edge, said inner edge and said base attachment opening in said base flange, whereby said first and second bracket elements are arrayed in opposed mirror image relation with the respective offset portions of said first and second bracket element link attachment flanges generally uniformly spaced a lesser distance than said first and second pin openings of opposing first and second bracket elements, and
   a link chain having a first set of generally parallel chain link plates pivotally attached by a first pivot pin to one of said first and second pin attachment openings of said opposed first and second bracket elements.

2. The bracket assembly of claim 1 further including a second set of first and second laterally spaced chain link plates attached by a second pivot pin to the other of said pin attachment openings.

3. The bracket assembly of claim 1 wherein said parallel spaced pin attachment openings are laterally spaced substantially the same distance.

4. The bracket assembly of claim 1 wherein said first set of said generally parallel chain link plates are substantially identical and each includes first and second laterally spaced pin connection openings and wherein the lateral spacing of the pin connection openings of the chain link plates is substantially equal to the lateral spacing of the first and second spaced pin openings of said chain link plates of said attachment flanges of said first and second bracket elements.

5. The bracket of claim 1 wherein the bracket assembly comprises a first plane of symmetry in a plane perpendicular to the bracket elements and a second plane of symmetry in a plane parallel to the opposed attachment flanges of the bracket elements.

6. A bracket assembly for mounting a link chain having pivot pins connecting spaced pairs of generally parallel, substantially identical, chain link plates, said chain capable of engagement by teeth of a drive sprocket in the space between said pairs of chain link plates and intermediate the pin connections of said pairs of chain link plates, said bracket assembly comprising:
   a support surface;
   substantially identical first and second unitary bracket elements, each bracket element including a generally planar, substantially uniformly thick base flange with a mounting surface, said base flange of said first and second bracket elements mounted upon said support surface and each base flange including an attachment opening through said base flange for receipt of a fastener for affixing said base flange to said support surface, said base flanges each including an outer edge and an inner edge,
   each said bracket element further including a generally planar, uniformly thick link attachment flange projecting generally transversely from the base flange along the outer edge, each said link attachment flange comprising a chain link attachment plate having first and second spaced pin attachment openings generally parallel to each other and spaced upwardly from the base flange, said first and second pin attachment openings of each attachment flange separated laterally from said base attachment opening of said base flange, said base attachment opening of each said base flange positioned medially between said first and second pin attachment openings, at least a portion of each said link attachment flange comprising an offset portion intermediate said first and second pin attachment openings, said offset portion offset laterally away from said outer edge, said inner edge and said base attachment openings of said respective first and second base flanges, whereby said first and second bracket elements are arrayed in opposed mirror image relation with the respective offset portions generally uniformly spaced a lesser distance than said first and second pin openings of said opposed link attachment flanges of said opposed first and second bracket elements, and at least one of said first and second pin attachment openings of said first and second bracket elements capable of connection with first and second spaced chain link plates pivotally attached by a pivot pin.

7. The assembly of claim 6 further including a link chain having first and second spaced chain link plates pivotally attached by a pivot pin to one of said pin attachment openings.

8. The assembly of claim 6 further including a second set of first and second laterally spaced chain link plates attached by a second pivot pin to the other of said pin attachment openings.

9. The bracket assembly of claim 6 wherein said parallel spaced pin attachment openings are laterally spaced substantially the same distance.

10. The bracket of claim 6 wherein the bracket assembly comprises a first plane of symmetry in a plane perpendicular to the bracket elements and in a second plane of symmetry parallel to the opposed attachment flanges of the bracket elements.

* * * * *